United States Patent
Han et al.

(10) Patent No.: US 10,266,740 B2
(45) Date of Patent: Apr. 23, 2019

(54) THERMALLY-CONDUCTIVE COMPOSITION AND METHOD FOR MANUFACTURING THE SAME

(71) Applicant: Hanmir Co., Ltd., Gimpo-si (KR)

(72) Inventors: Seung Woo Han, Seoul (KR); Sook Hyun Yoon, Incheon (KR); Jin Soon Byun, Seoul (KR)

(73) Assignee: HANMIR CO., LTD., Gimpo-si (KR)

( * ) Notice: Subject to any disclaimer, the term of this patent is extended or adjusted under 35 U.S.C. 154(b) by 1 day.

(21) Appl. No.: 15/638,464

(22) Filed: Jun. 30, 2017

(65) Prior Publication Data

US 2018/0002587 A1    Jan. 4, 2018

(30) Foreign Application Priority Data

Jul. 4, 2016  (KR) .................. 10-2016-0084346

(51) Int. Cl.
*C09K 5/14*     (2006.01)
*C03C 14/00*   (2006.01)

(52) U.S. Cl.
CPC ............. *C09K 5/14* (2013.01); *C03C 14/004* (2013.01)

(58) Field of Classification Search
CPC .................................. C09K 5/14; C03C 14/00
See application file for complete search history.

(56) References Cited

FOREIGN PATENT DOCUMENTS

| KR | 10-1248433 | * | 4/2013 |
| KR | 10-1248433 B1 | | 4/2013 |
| KR | 10-2013-0048744 | * | 5/2013 |
| KR | 10-2013-0048744 A | | 5/2013 |
| KR | 10-2015-0117329 | * | 10/2015 |
| KR | 10-2015-0117329 A | | 10/2015 |
| KR | 10-2016-0061044 | * | 5/2016 |
| KR | 10-2016-0061044 A | | 5/2016 |

* cited by examiner

*Primary Examiner* — Robert D. Harlan
(74) *Attorney, Agent, or Firm* — KORUS Patent, LLC; Seong Il Jeong (57) ABSTRACT

In a first aspect of the present disclosure, there is provided a thermally-conductive composition comprising: a functional agent comprising at least one of boron nitride (BN), silicon carbide (SiC), aluminum oxide ($Al_2O_3$), and aluminum nitride (AlN), and foamed inorganic thermally-conductive powders; and a binder comprising a silicate glass solution and isopropyl alcohol. The thermally-conductive composition may have improved endothermic, exothermic, and heat dissipation properties at high temperatures above about 1000° C. Further, the device using the thermally-conductive composition may have improved heat conductance and heat dissipation. Furthermore, the thermally-conductive composition may have reduced harmfulness to the human body.

7 Claims, 6 Drawing Sheets

THERMALLY-CONDUCTIVE COMPOSITION AND METHOD FOR MANUFACTURING THE SAME

CROSS-REFERENCE TO RELATED APPLICATION

This application claims a benefit of Korean patent application No. 10-2016-0084346 filed on Jul. 4, 2016, the entire content of which is incorporated herein by reference for all purposes as if fully set forth herein.

BACKGROUND

Field of the Present Disclosure

The present disclosure relates to a thermally-conductive composition and a method for manufacturing the same.

Discussion of Related Art

Thermal energy is related to all industries and lives. Thermal energy is being used in household appliances such as heaters and rice cookers. Thermal energy is used in medical devices such as an infrared-ray therapy apparatus and an infrared-ray based measuring apparatus. However, while studies on thermal energy have been focused on the consumption and development of energy sources, research on efficient heat energy dissipation has been neglected.

On the other hand, as mobile communication devices such as mobile phones and PDAs are miniaturized, parts used in such devices have also been miniaturized. In addition, parts for a display device such as a TV are also becoming smaller and thinner. Therefore, the heat generated inside such a device may cause a malfunction of the parts, and may decrease reliability and durability thereof. Therefore, studies on the heat release have been actively carried out all over the world.

A cooling fan, or a heat dissipation structure made of an alloy metal such as Cu or Al, which has high thermal conductivity is embedded into the various electronic devices, in order to remove heat generated during use of the various electronic devices. Such an approach may impose restrictions on the design of the devices and may prevent downsizing and weight reduction of the devices.

In addition, a composition used for exothermic, endothermic, or heat dissipation includes an organic binder and may thus be oxidized at a low temperature of from about 300° C. to about 600° C. Therefore, the stability thereof at high temperatures may be low. The composition may include organic substances harmful to the environment.

For example, thermal greases developed in the United States and Japan include organic binders and performance thereof may thus degrade at temperatures above about 300° C.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a thermally-conductive composition having improved endothermic, exothermic, and heat dissipation properties at high temperatures above about 1000° C. Further, the present disclosure is to provide a method for manufacturing the thermally-conductive composition.

Further, the present disclosure is to provide a thermally-conductive composition to allow a device using the thermally-conductive composition to have improved heat conductance and heat dissipation. Further, the present disclosure is to provide a method for manufacturing the thermally-conductive composition.

Moreover, the present disclosure is to provide a thermally-conductive composition having reduced harmfulness to the human body. Further, the present disclosure is to provide a method for manufacturing the thermally-conductive composition.

Embodiments according to the present disclosure may be employed to accomplish purposes as not specifically mentioned and other than the above-described purposes.

In a first aspect of the present disclosure, there is provided a thermally-conductive composition comprising: a functional agent comprising at least one of boron nitride (BN), silicon carbide (SiC), aluminum oxide ($Al_2O_3$), and aluminum nitride (AlN), and foamed inorganic thermally-conductive powders; and a binder comprising a silicate glass solution and isopropyl alcohol.

In one implementation of the first aspect, the foamed inorganic thermally-conductive powders are produced by: producing a first composition containing 100 wt % of distilled water, 4 to 9% by weight of a base liquid containing nitric acid ($HNO_3$) and magnesium (Mg), 14 to 21% by weight of sodium oxide ($Na_2O$), 45 to 56% by weight of silicon dioxide ($SiO_2$), 0.03 to 0.07% by weight of iron oxide ($Fe_2O_3$), 0.3 to 0.9% by weight of a dispersant, 1.6 to 5.2% by weight of magnesium carbonate ($MgCO_3$), and 3 to 9% by weight of potassium methyl siliconate; adding silicon (Si) to the first composition to obtain a second composition; and coagulating, foaming and pulverizing the second composition.

In one implementation of the first aspect, the functional agent further comprises iron oxide ($Fe_2O_3$).

In one implementation of the first aspect, the functional agent further includes at least one of graphite, graphene, carbon nanotube, and carbon fiber.

In one implementation of the first aspect, the thermally-conductive composition further includes at least one of boron carbide ($B_4C$), silicon nitride ($Si_3N_4$), zirconium oxide ($ZrO_2$), titanium dioxide ($TiO_2$), zinc oxide ($ZnO_2$), and zirconium nitride (ZrN).

In one implementation of the first aspect, the thermally-conductive composition further comprises at least one of a coupling agent, a dispersant, an anti-settling agent, a crack inhibitor, and an adhesion promoter.

In one implementation of the first aspect, the binder further comprises an aluminum silicate, wherein the binder comprises 70 to 85% by weight of the silicate glass solution, 5 to 15% by weight of the isopropyl alcohol, and 5 to 15% by weight of the aluminum silicate, based on a total weight of the binder.

In a second aspect of the present disclosure, there is provided a method for producing a thermally-conductive composition, the method comprising: providing a functional agent comprising at least one of boron nitride (BN), silicon carbide (SiC), aluminum oxide ($Al_2O_3$), and aluminum nitride (AlN), and foamed inorganic thermally-conductive powders; providing a binder; and mixing the functional agent into the binder.

In one implementation of the second aspect, providing the binder comprises: adding formic acid or acetic acid to distilled water to form a first mixture; adjusting pH of the first mixture to 4.3 to 4.5; stirring the first mixture; adding a silicate glass solution to the first mixture to form a second mixture; adding silane ($SiH_4$) to the second mixture 4 to 10 times to form a third mixture; stirring the third mixture for 2 to 4 hours; aging the third mixture at room temperature for 4 to 12 hours; and adding isopropyl alcohol to the third mixture and stopping reaction therein.

In one implementation of the second aspect, providing the foamed inorganic thermally-conductive powders includes: producing a first composition containing 100 wt % of distilled water, 4 to 9% by weight of a base liquid containing nitric acid ($HNO_3$) and magnesium (Mg), 14 to 21% by weight of sodium oxide ($Na_2O$), 45 to 56% by weight of silicon dioxide ($SiO_2$), 0.03 to 0.07% by weight of iron oxide ($Fe_2O_3$), 0.3 to 0.9% by weight of a dispersant, 1.6 to 5.2% by weight of magnesium carbonate ($MgCO_3$), and 3 to 9% by weight of potassium methyl siliconate; adding silicon (Si) to the first composition to obtain a second composition; and coagulating, foaming and pulverizing the second composition.

In accordance with the present disclosure, the thermally-conductive composition may have improved endothermic, exothermic, and heat dissipation properties at high temperatures above about 1000° C. Further, the device using the thermally-conductive composition may have improved heat conductance and heat dissipation. Furthermore, the thermally-conductive composition may have reduced harmfulness to the human body.

DETAILED DESCRIPTIONS

Figure 1:
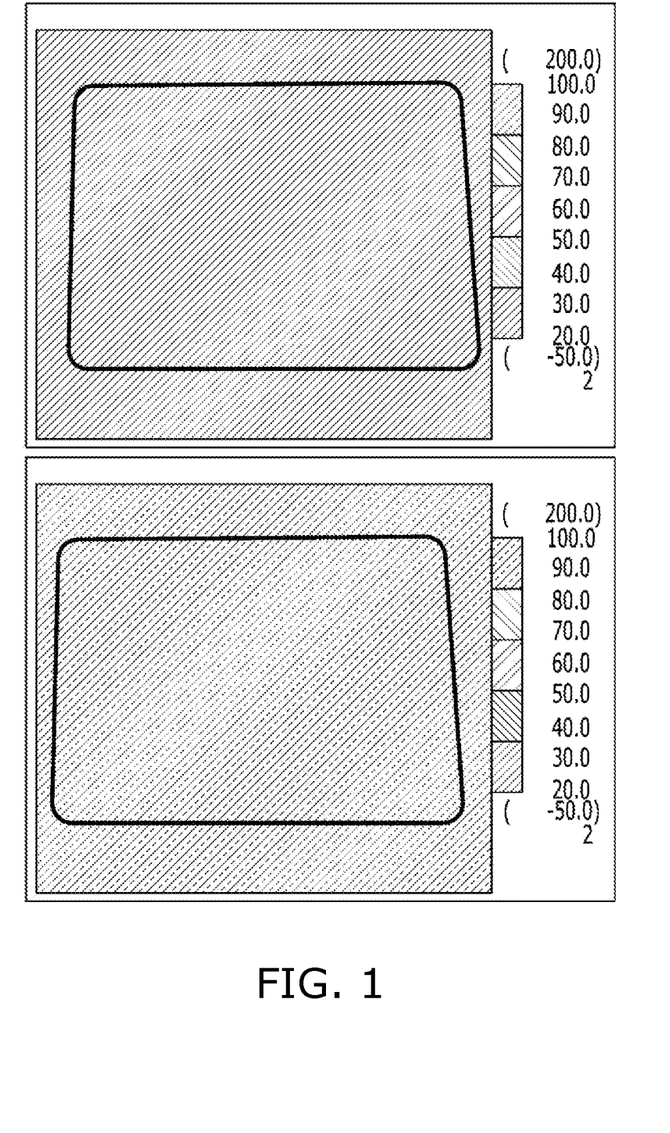
FIG. 1 is a graph comparing between a heat dissipation of an aluminum thin sheet without a thermally-conductive composition according to the present disclosure coated thereon, and a heat dissipation of an aluminum thin sheet having a thermally-conductive composition according to the present disclosure coated thereon.
Figure 2:
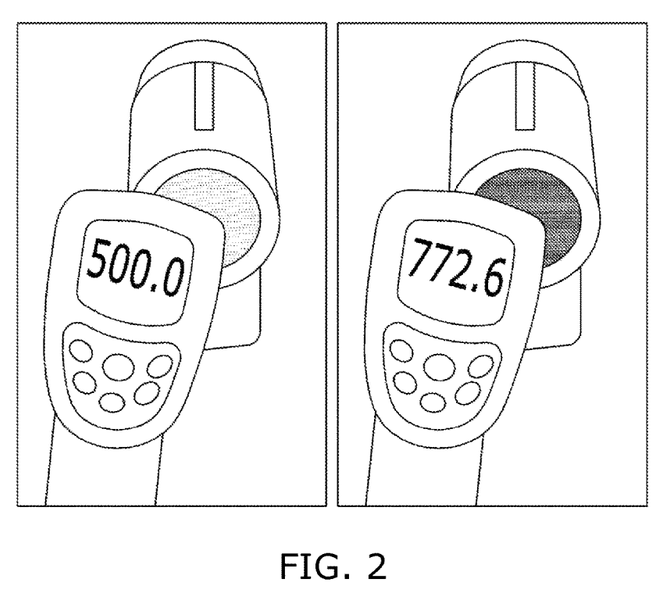
FIG. 2 is a view comparing between a temperature around a heat source without a thermally-conductive composition according to the present disclosure coated thereon, and a temperature around a heat source having a thermally-conductive composition according to the present disclosure coated thereon.
Figure 3:
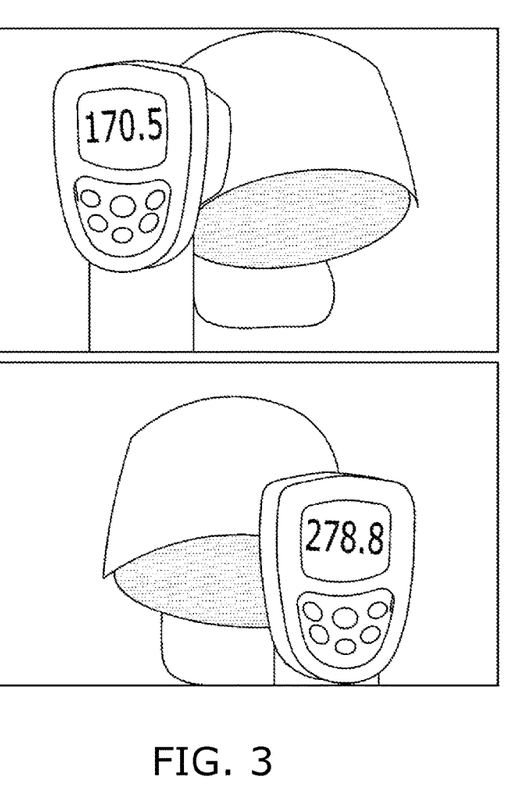
FIG. 3 is a view comparing between a temperature around a heat source without a thermally-conductive composition according to the present disclosure coated thereon, and a temperature around a heat source having a thermally-conductive composition according to the present disclosure coated thereon.
Figure 4:
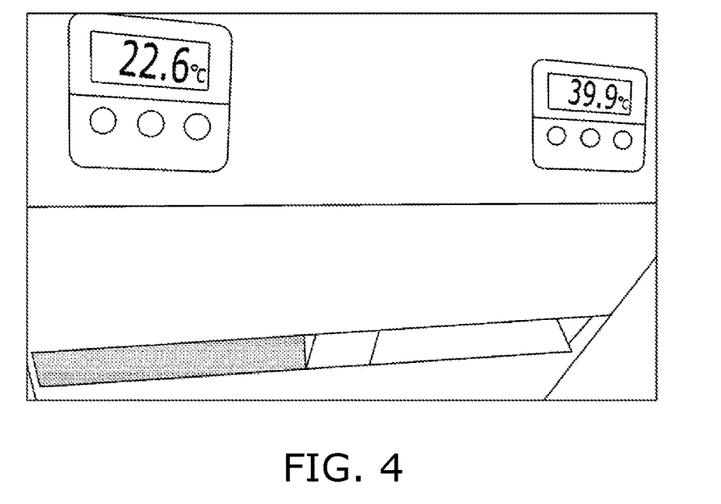
FIG. 4 is a view comparing between a temperature within a hexahedron structure without a thermally-conductive composition according to the present disclosure coated thereon, and a temperature within a hexahedron structure having a thermally-conductive composition according to the present disclosure coated thereon.
Figure 5:
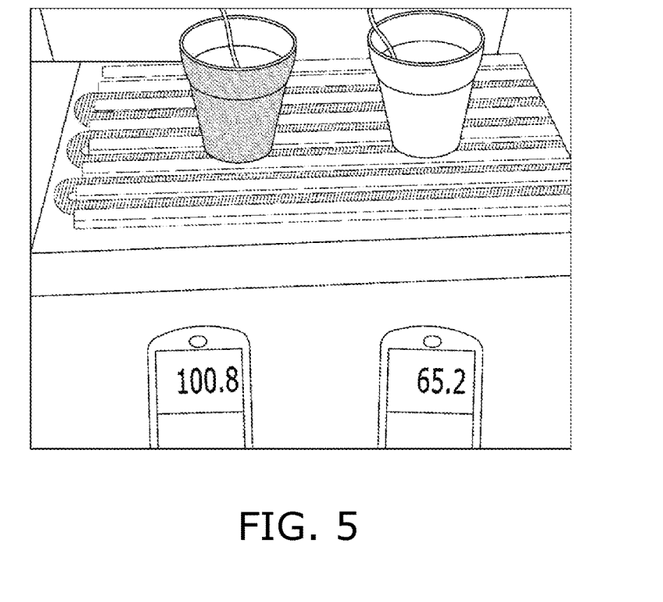
FIG. 5 is a view comparing between a temperature of water in a cup without a thermally-conductive composition according to the present disclosure coated thereon when the cup is heated, and a temperature of water in a cup having a thermally-conductive composition according to the present disclosure coated thereon when the cup is heated.
Figure 6:
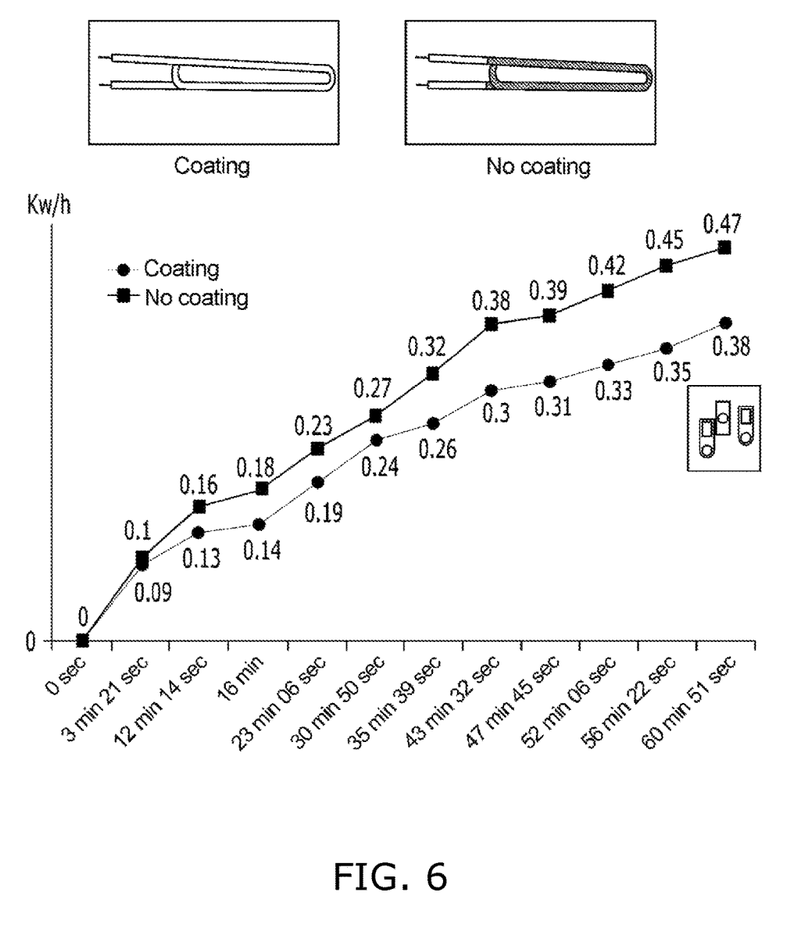
FIG. 6 is a view comparing between a power consumption for a heat pipe without a thermally-conductive composition according to the present disclosure coated thereon, and a power consumption for a heat pipe having a thermally-conductive composition according to the present disclosure coated thereon.
Figure 7:
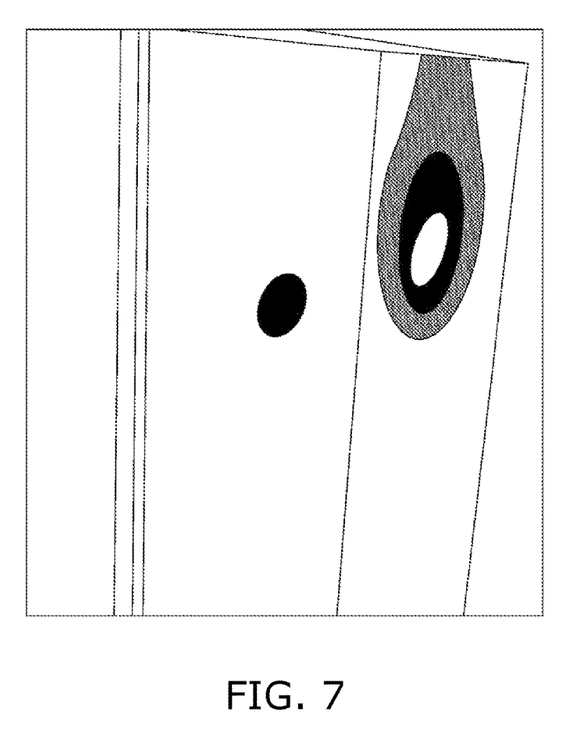
FIG. 7 is a view showing results of non-combustibility test at 1300° C. for a planar substrate without a thermally-conductive composition according to the present disclosure coated thereon, and for a planar substrate having a thermally-conductive composition according to the present disclosure coated thereon.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

In one aspect of the present disclosure, a thermally-conductive composition may comprise a functional agent comprising at least one of boron nitride (BN), silicon carbide (SiC), aluminum oxide ($Al_2O_3$), and aluminum nitride (AlN), and foamed inorganic thermally-conductive powders; and a binder comprising a silicate glass solution and isopropyl alcohol.

In one embodiment, the foamed inorganic thermally-conductive powders may be produced by producing a first composition containing 100 wt % of distilled water, 4 to 9% by weight of a base liquid containing nitric acid ($HNO_3$) and magnesium (Mg), 14 to 21% by weight of sodium oxide ($Na_2O$), 45 to 56% by weight of silicon dioxide ($SiO_2$), 0.03 to 0.07% by weight of iron oxide ($Fe_2O_3$), 0.3 to 0.9% by weight of a dispersant, 1.6 to 5.2% by weight of magnesium carbonate ($MgCO_3$), and 3 to 9% by weight of potassium methyl siliconate; adding silicon (Si) to the first composition to obtain a second composition; and coagulating, foaming and pulverizing the second composition.

An example of a process for producing the foamed inorganic thermally-conductive powders is as follows.

About 14 to about 21 weight percent sodium oxide, about 45 to about 56 weight percent silicon dioxide, about 0.03 to about 0.07 weight percent iron oxide, and about 0.3 to about 0.9 weight percent dispersant are added into about 100 weight percent of distilled water, thereby to form a first mixture, Then, the first mixture is stirred in a heating stirrer while gradually heated to a temperature of about 60 to about 90° C. for 20 minutes.

Next, about 1.6 to about 5.2% by weight of magnesium carbonate and about 4 to about 9% by weight of the base liquid are added to the first mixture to form a second mixture. The second mixture is then stirred until water vapor is evacuated from the second mixture.

When water vapor is generated from the second mixture, about 3 to 9 wt % of potassium methyl silicoate is added to the second mixture to form a third mixture. Then, the third mixture is heated and stirred for about 1 to 30 minutes to about 2 hours. Thereby, the third mixture becomes transparent. At this time, the heating is stopped and the third mixture is stirred until it cools.

Next, about 0.1 to about 40 wt % of silicon (Si) is added to the third mixture to form a fourth mixture. Thereafter, the fourth mixture is introduced into a dryer with a thickness of the mixture being about 2 cm. The fourth mixture is subjected to an exothermic reaction at a temperature of about 20° C. or higher for about 24 hours. The fourth mixture is then solidified and foamed to form solidified and foamed mixture.

Thereafter, the solidified and foamed mixture is roughly pulverized. Then, the roughly pulverized mixture is further finely powdered to produce the foamed inorganic thermally-conductive powders with an average particle size of the power being about 20 microns or less.

The foamed inorganic thermally-conductive powders may have stable non-flammability even at high temperature of about 1000° C. or higher, and may have excellent heat dissipation, endothermic and exothermic performance.

Boron nitride may have excellent heat dissipation performance even in a high temperature environment of about 1000° C. or higher, and good stretchability.

Silicon carbide may have excellent heat resistance, oxidation resistance and corrosion resistance even at a high temperature of about 1500° C., may have excellent thermal conductivity, and excellent mechanical durability. The silicon carbide may be, for example, a high purity green carbide.

Aluminum oxide ($Al_2O_3$) may be stable even at a high temperature environment of about 1500° C. and may have excellent fire-resistance performance.

Aluminum nitride may be stable even at a high temperature of about 1700 degree C., and may be excellent in thermal conductivity, and may have electrical insulation.

The functional agent comprising at least one of boron nitride (BN), silicon carbide (SiC), aluminum oxide ($Al_2O_3$) and aluminum nitride (AlN), and the foamed inorganic thermally-conductive powders may have improved endothermic, exothermic and heat dissipation performance. As such, a device comprising the thermally-conductive composition may have improved heat dissipation.

In one embodiment, the functional agent further comprises iron oxide ($Fe_2O_3$). The iron oxide may improve the heat dissipation of the thermally-conductive composition and may block electromagnetic waves.

In one embodiment, the functional agent further includes at least one of graphite, graphene, carbon nanotube, and carbon fiber.

The graphite can improve the durability and heat resistance of the thermally-conductive composition in a vacuum state. The graphene or carbon nanotubes can improve the thermal conductivity of the thermally-conductive composition. Carbon fibers can improve the thermal conductivity and heat dissipation performance of the thermally-conductive composition.

In one embodiment, the functional agent further includes at least one of boron carbide ($B_4C$), silicon nitride ($Si_3N_4$), zirconium oxide ($ZrO_2$), titanium dioxide ($TiO_2$), zinc oxide ($ZnO_2$), and zirconium nitride (ZrN).

In this connection, boron carbide or silicon nitride can improve the heat dissipation performance, heat resistance, thermal conductivity, etc. of the thermally-conductive composition. Zirconium oxide can improve the refractory performance of the thermally-conductive composition to about 1800° C. Titanium dioxide can improve the corrosion resistance and hiding power of the thermally-conductive composition. Zinc oxide can perform the function of a fluorescent pigment. Zirconium nitride can improve the corrosion resistance of the thermally-conductive composition.

In one embodiment, the thermally-conductive composition further comprises at least one of a coupling agent, a dispersant, an anti-settling agent, a crack inhibitor, and an adhesion promoter. In this connection, about 0.2 to about 1 weight percent of the coupling agent, about 0.2 to about 1 weight percent of the dispersing agent, about 0.2 to about 1 weight percent of the anti-settling agent, and about 0.2 to about 1 weight percent of the crack inhibitor, and about 0.2% to about 1% by weight of the adhesion promoter may be contained.

In one embodiment, the binder further comprises an aluminum silicate. Aluminum silicate is an environmentally friendly material which is free of a harmful heavy metal such as lead and cadmium, volatile organic compounds (VOCs), and which has no toxicity. The aluminum silicate is an incombustible material having a melting point of about 1,800° C. The aluminum silicate coating may be a very hard structure with a compressive strength of about 3,000 $N/cm^2$, so that the durability of the thermally-conductive composition may be improved.

In one embodiment, the binder comprises 70 to 85% by weight of the silicate glass solution, 5 to 15% by weight of the isopropyl alcohol, and 5 to 15% by weight of the aluminum silicate, based on a total weight of the binder. Within this content range, the binding force between the functional agent and the binder may be improved.

The thermally-conductive composition can radiate far-infrared rays via receiving heat generated from the outside. Accordingly, the thermally-conductive composition may be applied to, for example, a medical infrared ray irradiator, a heating and sterilizing device for indoor gardening, and a food (organic) drier.

Further, the thermally-conductive composition has high efficiency endothermic and exothermic properties and, thus, may be applied to various heaters, electric heaters, heat-resisting devices, high temperature ceramic furnaces, dry furnaces, incinerators, heat exchangers and kitchen utensils, etc.

Moreover, the thermally-conductive composition has excellent heat dissipation performance. Therefore, the thermally-conductive composition may have a wide variety of applications to an outdoor unit for an air conditioner, a communication repeater, a semiconductor equipment, a transformer, a solar power equipment, a display device, an electronic circuit chip, a wiring, an automobile engine, a radiator, a battery, a heater, a cooler, CPU, a mobile phone, a tablet computer, an audio device, a speaker (amplifier), a weapon, an aircraft, a ship, a space aircraft, and the like. The present disclosure is not limited thereto.

Hereinafter, a method of producing the thermally-conductive composition will be described.

A method for producing a thermally-conductive composition may include providing a functional agent comprising at least one of boron nitride (BN), silicon carbide (SiC), aluminum oxide ($Al_2O_3$), and aluminum nitride (AlN), and foamed inorganic thermally-conductive powders; providing a binder; and mixing the functional agent into the binder, In one embodiment, providing the foamed inorganic thermally-conductive powders includes: producing a first composition containing 100 wt % of distilled water, 4 to 9% by weight of a base liquid containing nitric acid ($HNO_3$) and magnesium (Mg), 14 to 21% by weight of sodium oxide ($Na_2O$), 45 to 56% by weight of silicon dioxide ($SiO_2$), 0.03 to 0.07% by weight of iron oxide ($Fe_2O_3$), 0.3 to 0.9% by weight of a dispersant, 1.6 to 5.2% by weight of magnesium carbonate ($MgCO_3$), and 3 to 9% by weight of potassium methyl siliconate; adding silicon (Si) to the first composition to obtain a second composition; and coagulating, foaming and pulverizing the second composition.

In one embodiment, providing the binder comprises: adding formic acid or acetic acid to distilled water to form a first mixture; adjusting pH of the first mixture to 4.3 to 4.5; stirring the first mixture; adding a silicate glass solution to the first mixture to form a second mixture; adding silane ($SiH_4$) to the second mixture 4 to 10 times to form a third mixture; stirring the third mixture for 2 to 4 hours; aging the third mixture at room temperature for 4 to 12 hours; and adding isopropyl alcohol to the third mixture and stopping reaction therein.

More specifically, first, formic acid or acetic acid may be added to distilled water to form a first mixture. Then, pH of the first mixture may be adjusted to 4.3 to 4.5. Then, the first mixture may be stirred. The pH adjustment may improve reaction rate.

Next, a silicate glass solution may be added to the first mixture to form a second mixture. Then, silane ($SiH_4$) may be added to the second mixture 4 to 10 times to form a third mixture. In this connection, the more the silane added, the smaller the ductility of the binder, while the smaller the silane added, the more flexible the binder. If the silane is not added in a divided manner, the silane may stick together. The silicate glass solution may be, for example, colloidal silica. The present disclosure is not limited thereto.

Subsequently, the third mixture may be aged at room temperature for 4 to 12 hours. Then, isopropyl alcohol as a reaction delay agent may be added to the third mixture, to stop reaction therein.

In accordance with the present disclosure, the thermally-conductive composition may have improved endothermic, exothermic, and heat dissipation properties at high temperatures above about 1000° C. Further, the device using the thermally-conductive composition may have improved heat conductance and heat dissipation. Furthermore, the thermally-conductive composition may have reduced harmfulness to the human body.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A thermally-conductive composition comprising:
a functional agent comprising
at least one member selected from the group consisting of boron nitride (BN), silicon carbide (SiC), aluminum oxide ($Al_2O_3$), and aluminum nitride (AlN), and foamed inorganic thermally-conductive powders; and
a binder comprising a silicate glass solution and isopropyl alcohol,
wherein the foamed inorganic thermally-conductive powders are produced by:
producing a first composition containing 100 wt % of distilled water, 4 to 9% by weight of a base liquid containing nitric acid ($HNO_3$) and magnesium (Mg), 14 to 21% by weight of sodium oxide ($Na_2O$), 45 to 56% by weight of silicon dioxide ($SiO_2$), 0.03 to 0.07% by weight of iron oxide ($Fe_2O_3$), 0.3 to 0.9% by weight of a dispersant, 1.6 to 5.2% by weight of magnesium carbonate ($MgCO_3$), and 3 to 9% by weight of potassium methyl siliconate;
adding silicon (Si) to the first composition to obtain a second composition; and
coagulating, foaming and pulverizing the second composition.

2. The thermally-conductive composition of claim 1, wherein the functional agent further comprises iron oxide ($Fe_2O_3$).

3. The thermally-conductive composition of claim 2, wherein the functional agent further includes at least one member selected from the group consisting of graphite, graphene, carbon nanotube, and carbon fiber.

4. The thermally-conductive composition of claim 1, wherein the functional agent further includes at least one member selected from the group consisting of boron carbide ($B_4C$), silicon nitride ($Si_3N_4$), zirconium oxide ($ZrO_2$), titanium dioxide ($TiO_2$), zinc oxide ($ZnO_2$), and zirconium nitride (ZrN).

5. The thermally-conductive composition of claim 4, wherein the thermally-conductive composition further comprises at least one member selected from the group consisting of a coupling agent, a dispersant, an anti-settling agent, a crack inhibitor, and an adhesion promoter.

6. The thermally-conductive composition of claim 1, wherein the binder further comprises an aluminum silicate, wherein the binder comprises 70 to 85% by weight of the silicate glass solution, 5 to 15% by weight of the isopropyl alcohol, and 5 to 15% by weight of the aluminum silicate, based on a total weight of the binder.

7. A method for producing a thermally-conductive composition, the method comprising:
providing a functional agent comprising
at least one member selected from the group consisting of boron nitride (BN), silicon carbide (SiC), aluminum oxide ($Al_2O_3$), and aluminum nitride (AlN), and
foamed inorganic thermally-conductive powders;
providing a binder; and
mixing the functional agent into the binder,
wherein providing the binder comprises:
adding formic acid or acetic acid to distilled water to form a first mixture;
adjusting pH of the first mixture to 4.3 to 4.5;
stirring the first mixture;
adding a silicate glass solution to the first mixture to form a second mixture;
adding silane ($SiH_4$) to the second mixture 4 to 10 times to form a third mixture;
stirring the third mixture for 2 to 4 hours;
aging the third mixture at room temperature for 4 to 12 hours; and
adding isopropyl alcohol to the third mixture and stopping reaction therein,
wherein providing the foamed inorganic thermally-conductive powders includes:
producing a first composition containing 100 wt % of distilled water, 4 to 9% by weight of a base liquid containing nitric acid ($HNO_3$) and magnesium (Mg), 14 to 21% by weight of sodium oxide ($Na_2O$), 45 to 56% by weight of silicon dioxide ($SiO_2$), 0.03 to 0.07% by weight of iron oxide ($Fe_2O_3$), 0.3 to 0.9% by weight of a dispersant, 1.6 to 5.2% by weight of magnesium carbonate ($MgCO_3$), and 3 to 9% by weight of potassium methyl siliconate;
adding silicon (Si) to the first composition to obtain a second composition; and
coagulating, foaming and pulverizing the second composition.

* * * * *